Sept. 30, 1969   C. O. KIRCHNER ET AL   3,469,608
COIL SPRING POSITIONING DEVICE
Filed July 26, 1967   7 Sheets-Sheet 2

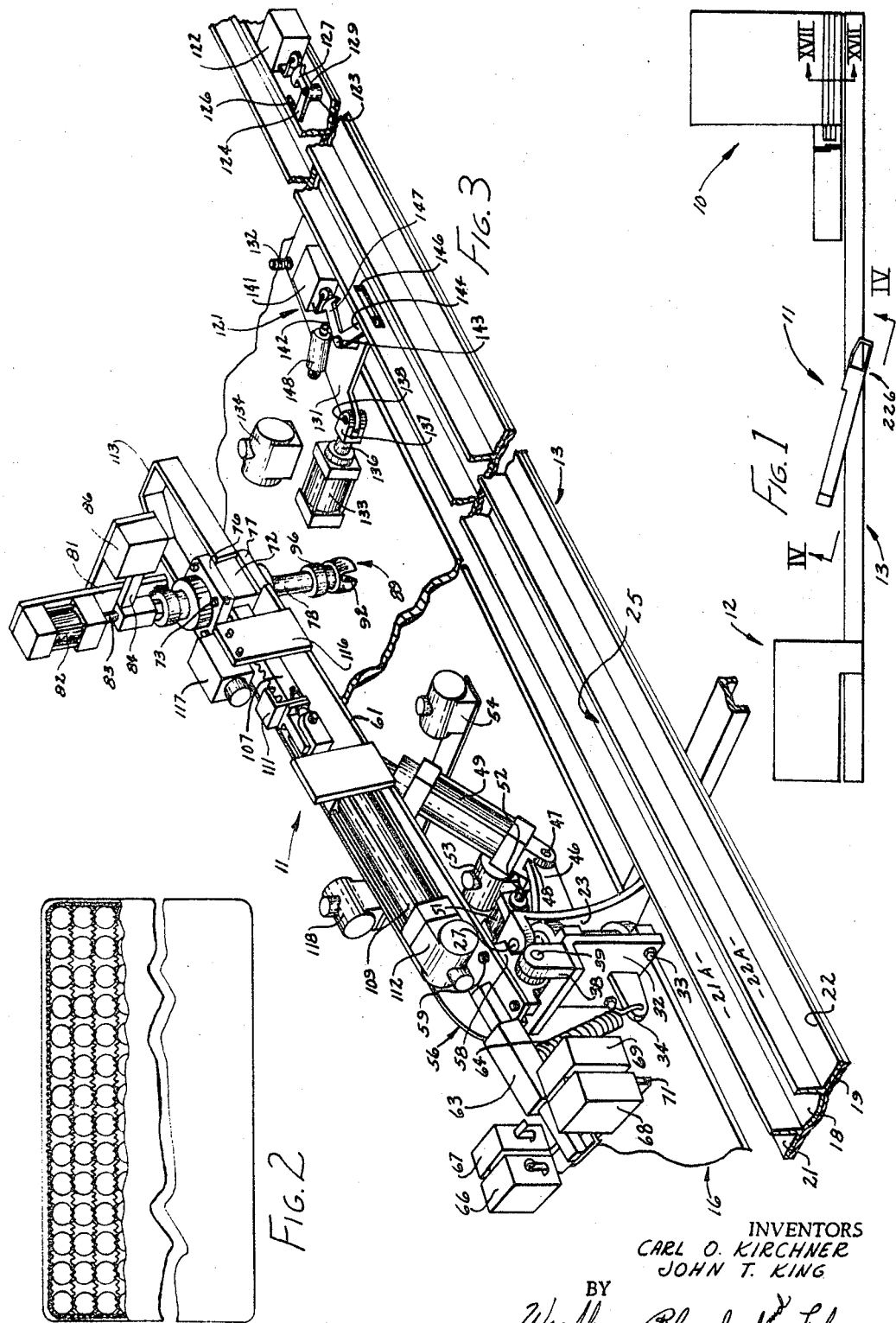

INVENTORS
CARL O. KIRCHNER
JOHN T. KING
BY
Woodhams, Blanchard & Flynn
ATTORNEYS

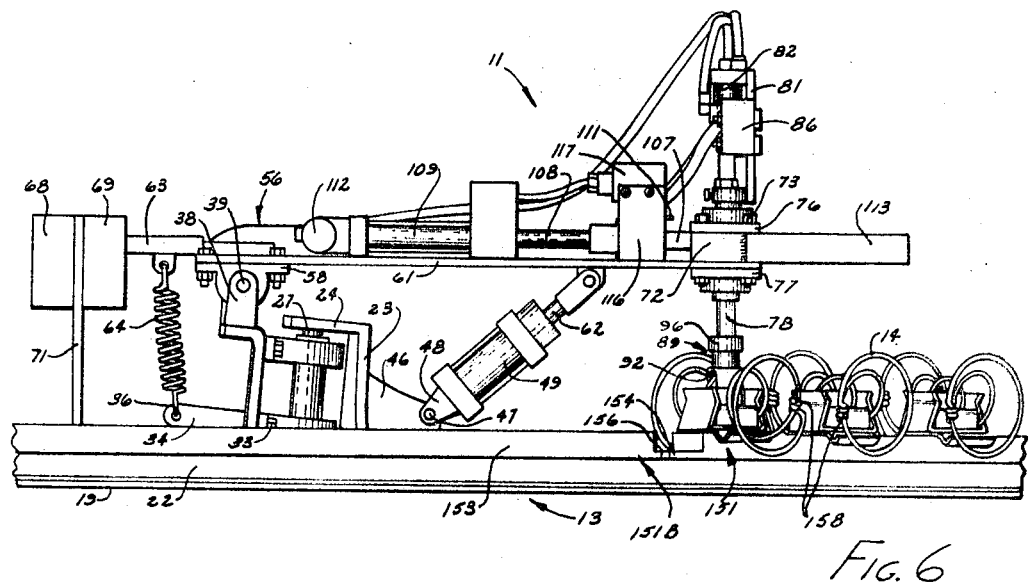

Sept. 30, 1969　　　C. O. KIRCHNER ET AL　　　3,469,608
COIL SPRING POSITIONING DEVICE Filed July 26, 1967　　　　　　　　　　　　7 Sheets-Sheet 4

INVENTORS
CARL O. KIRCHNER
JOHN T. KING
BY
Woodhams, Blanchard & Flynn
ATTORNEYS INVENTORS
CARL O. KIRCHNER
JOHN T. KING
BY
Woodhams, Blanchard & Flynn
ATTORNEYS Sept. 30, 1969     C. O. KIRCHNER ET AL     3,469,608
COIL SPRING POSITIONING DEVICE
Filed July 26, 1967     7 Sheets-Sheet 6
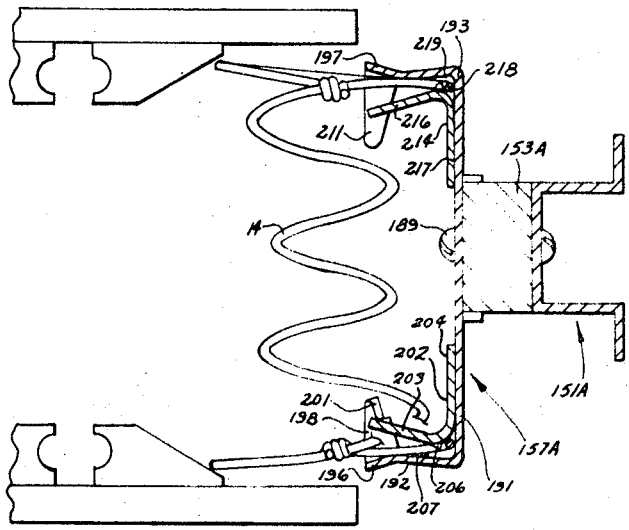
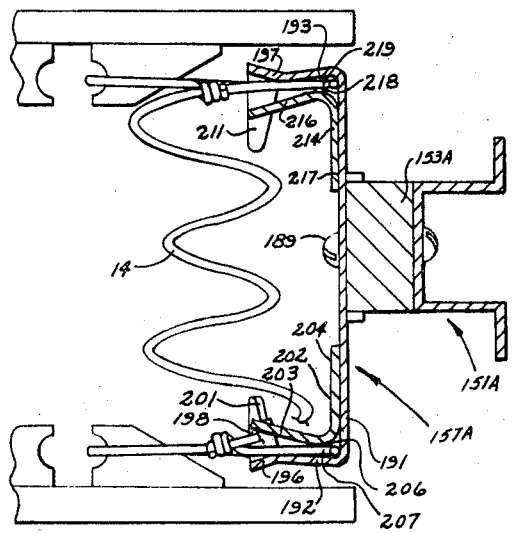
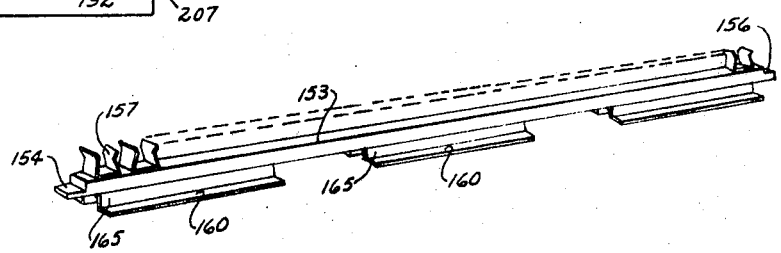
INVENTORS
CARL O. KIRCHNER
JOHN T. KING
BY
Woodhams, Blanchard & Flynn
ATTORNEYS

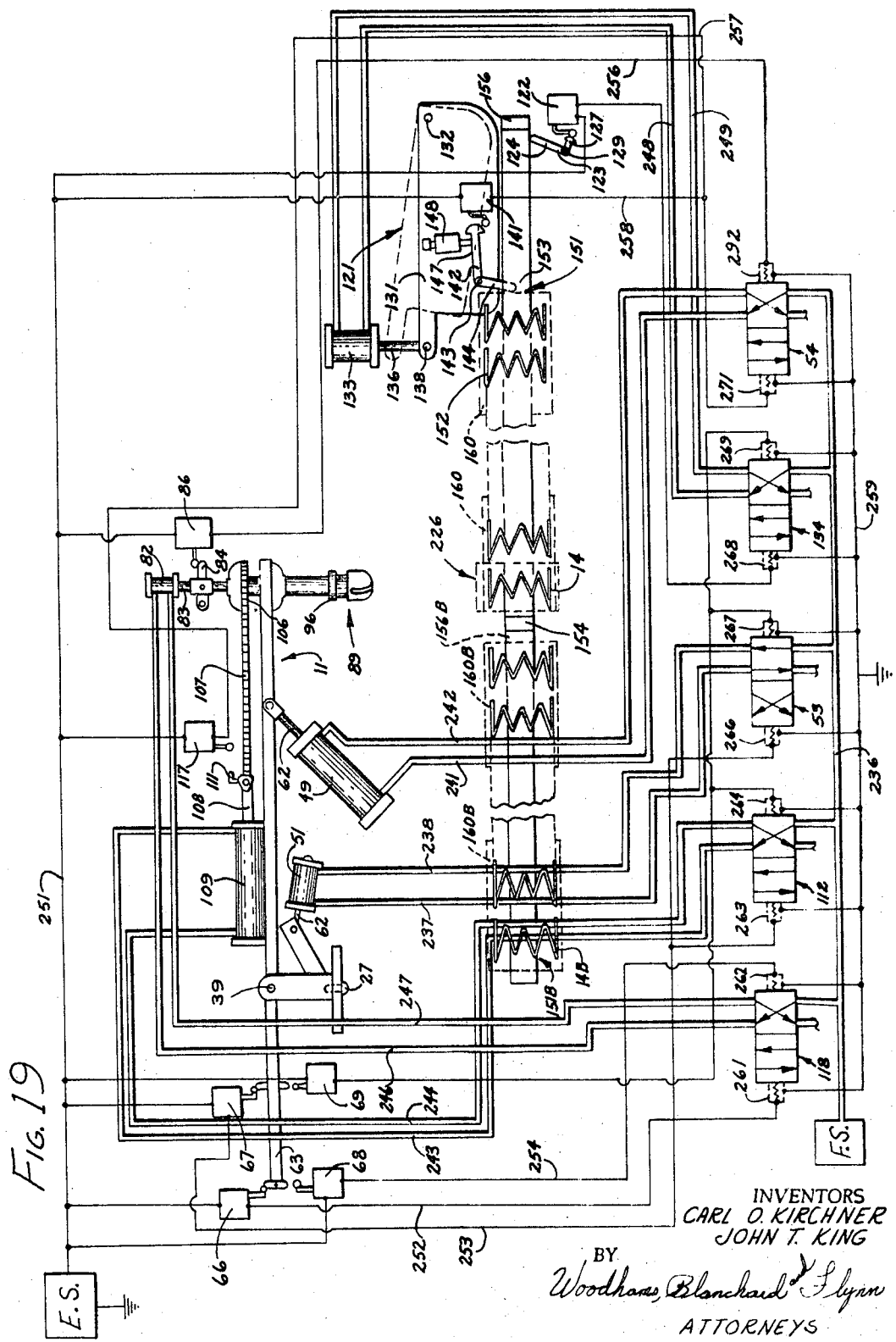

United States Patent Office 3,469,608
Patented Sept. 30, 1969

3,469,608
COIL SPRING POSITIONING DEVICE
Carl O. Kirchner, Carthage, and John T. King, McDonald Township, Jasper County, Mo., assignors to Leggett and Platt Incorporated, Carthage, Mo., a corporation of Missouri
Filed July 26, 1967, Ser. No. 656,109
Int. Cl. B21f 27/00; A47c 31/04
U.S. Cl. 140—3            10 Claims

ABSTRACT OF THE DISCLOSURE

An apparatus including a magazine for holding coil springs, a platform supporting the magazine and a mechanism mounted adjacent said platform and having a head engageable with a coil spring held in a magazine, whereby the coil spring can be removed from the magazine and then returned to the magazine in a different position. The apparatus includes means for moving the magazine to a machine in which the coil springs become part of a spring assembly.

FIELD OF THE INVENTION

This application relates in general to a spring assembly machine and, more particularly, to a type thereof wherein the coil springs are formed and placed in clamps in a magazine which is advanced to a position where the springs are connected with other coil springs by helical tie wires. The assembly machine includes a mechanism whereby the position of one of said coil springs is changed during said advancement in order to improve the quality of the spring assembly.

DESCRIPTION OF THE PRIOR ART

As is well known by persons acquainted with the manufacture of spring assemblies used in mattresses, cushions and the like, it is now possible to fabricate such spring assemblies by substantially completely automatic machinery. However, where the coil springs are advanced to the spring assembly machinery in an elongated magazine, as is disclosed in U.S. Patent No. 3,205,915, it is desirable to reverse the position of the coil spring at one end of the magazine to provide a more satisfactory spring assembly. That is, each coil spring has a "knot" at each of the points where the ends of the spring wire are wound upon an adjacent convolution of the coil. If these knots are not properly positioned in each magazine, they will interfere with the feeding of the helical tie wires into engagement with rows of springs and/or the periphery of the assembly of coil springs. Further, if the knots are permitted to face outwardly at the end of each row, they will cause premature wear of the spring covering fabric. Heretofore, the locations of the knots at the ends of each row have either been ignored or the position of these coil springs have been changed manually at an increased cost in time and labor.

In existing automated spring assembly machines of the type discussed in the foregoing paragraph, the coil-holding magazine is comprised of a plurality of spaced clamps, each of which engages the centrally disposed convolutions of a coil spring. This type of clamp structure creates two problems. In the first place, the centrally located convolutions are not uniform in size and shape or in position relative to their outermost convolutions due to manufacturing variations which appear to be economically unavoidable. Thus, the coil springs are sometimes improperly inserted into the clamps, which necessitates careful and constant visual inspection by the machine operator and occasional adjustment. Moreover, these irregularities in the central convolutions of coil springs tend to complicate the mechanism which will automatically engage the endmost coil spring in each magazine and change its position as desired.

In the second place, the irregularities in the coil springs and the design of existing clamps render the magazine having such clamps incapable of moving the springs into the coil-engaging jaws of the assembly machine in a fully acceptable manner. That is, by using the type of clamps shown in the aforesaid Patent No. 3,205,915, which engage the central convolutions, the outermost convolutions of the springs frequently are not properly moved into the jaws of the assembly mechanism. The inherent resiliency and flexibility of the coil springs further complicates this problem. Thus, the machine operator must carefully and constantly inspect and check the coil springs in the assembly mechanism to make sure that the magazine has properly advanced them into position for engagement by the helicals. Usually, at least one coil spring in each magazine must be manually adjusted into its proper position within the jaws.

Accordingly, a primary object of this invention has been the provision of automatic mechanism whereby a coil spring held by a magazine in an automatic spring assembly machine is removed from the clamp on the magazine, rotated approximately 180 degrees and returned to the same clamp on the magazine.

A further object of this invention has been the provision of a coil spring holding magazine having improved spring clamping devices which not only engage the coil springs in a more uniform manner, but also hold said coil springs so that their outermost convolutions are positively engaged and, therefore, can be positively inserted into the jaws of the spring assembly mechanism.

It is a further object to provide improved spring clamping devices which align the end convolutions of the coil springs lengthwise of the magazine in which they are held.

Other objects and purposes of this invention will become apparent to persons familiar with this type of equipment upon reading the following descriptive material and examining the accompanying drawings, in which:

FIGURE 1 is a schematic plan view of the assembly machine used in the manufacture of bed springs, said machine incorporating the device of the present invention;

FIGURE 2 is a broken and fragmentary plan view of an assembled mattress fabricated from a spring assembly of the type made by said machine.

FIGURE 3 is a perspective view of a coil-positioning device embodying the invention;

FIGURE 6 is a side elevational view of the coil-positioning device inserting the rotated coil spring into the magazine;

FIGURE 7 is a sectional view taken along the line VII—VII in FIGURE 4;

FIGURE 8 is a sectional view taken along the line VIII—VIII in FIGURE 4 with the clamp in dotted lines;

FIGURE 17 is a sectional view about as taken along the line XVII—XVII in FIGURE 1 showing a spring assembly mechanism and a magazine with the modified clamp holding a coil spring as it approaches assembly position;

FIGURE 18 is a sectional view similar to FIGURE 17 with the coil spring inserted into the jaws of the assembly mechanism;

FIGURE 19 is a schematic diagram of the fluid system and electrical circuitry concerned with the operation of the positioning device embodying the invention.

FIGURE 20 is a perspective view of a magazine without springs in the clamps.

Figures 4, 5:
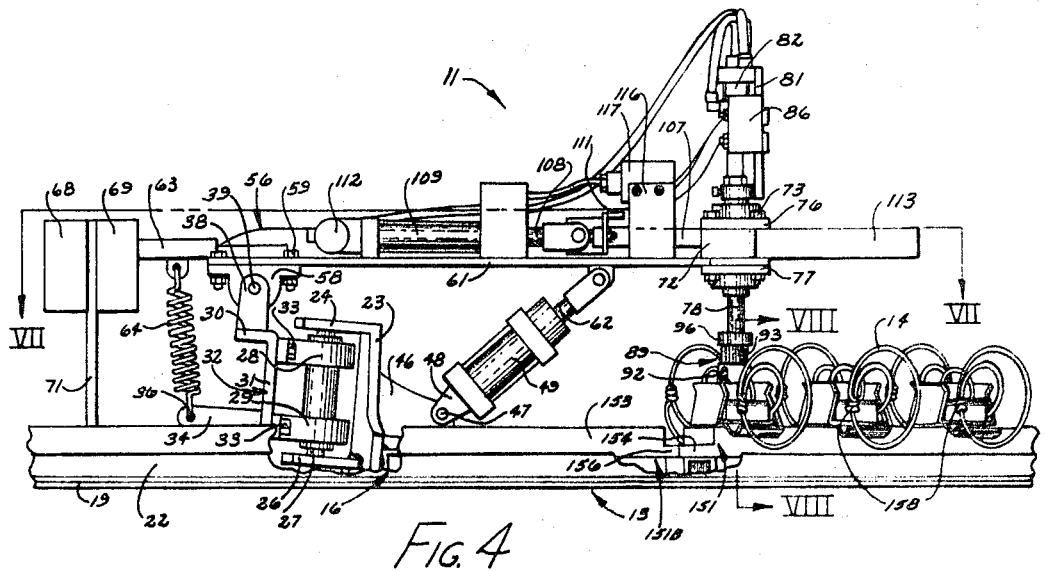
FIGURE 4 is a side elevational view of the coil-positioning device engaging a coil spring held in a magazine as viewed from the line IV—IV in FIGURE 1.
FIGURE 5 is a side elevational view of the coil-positioning device holding a coil spring in the raised position after it has been rotated 180 degrees from its FIGURE 4 position.

Certain terminology may be used in the following description for convenience in reference only. For example, the words "upwardly" and "downwardly" will designate directions as applied to the structure as appearing in FIGURE 4. The words "front" or "leading" and "rear" or "trailing" will have reference to the right and to the left, respectively, of the structure appearing in FIGURE 4. The words "inwardly" and "outwardly" will refer to the directions toward and away from, respectively, the geometric center of the positioning device and designated parts thereof. Such terminology will include the words above specifically mentioned, derivatives thereof and words of similar import.

SUMMARY OF THE INVENTION

The objects and purposes of the invention have been met by providing a spring assembly machine having a coil-positioning mechanism mounted adjacent a conveyor and engageable with a coil spring held by a magazine while it is advanced into and out of a station along said conveyor, after which said coil and other coils are interconnected to form a spring assembly.

DETAILED DESCRIPTION

The objects and purposes of the invention including those set forth above have been further met by providing an apparatus comprising an improved coil positioning device and a magazine having improved clamps which engage the endmost convolutions of the coil springs held in the magazine.

Referring now to FIGURE 1, a spring assembly machine 10 is schematically illustrated in combination with a spring-positioning device 11 embodying the invention and positioned near a conveyor 13 which advances the springs 14 from a coil-forming machine 12 to the spring assembly machine 10.

The conveyor 13 comprises an elongated plate 19 secured to channel-shaped members 17 which are connected to the frame 16, all by any convenient means (not shown). A pair of longitudinally extending and parallel guide angles 21 and 22 are secured upon the plate 19, as by welding, so that their spaced, upright flanges 21A and 22A define a channel 25. An endless belt 18 having a width equal to the spacing between the parallel flanges 21A and 22A extends along said channel past the device 11 to the spring assembly machine 10. The endless belt 18 is driven by apparatus not shown.

A C-shaped member 23 (FIGURE 4) is secured to the frame 16 by any convenient means, such as welding. The rearwardly extending legs 24 and 26 thereof are rigidly secured to the opposite ends of a shaft 27. A pair of bearing members 28 and 29 are rotatably supported on the shaft 27 and are secured to the leg 31 of an L shaped member 32 by bolts 33. A flange 34 which extends rearwardly from the leg 31, has at its rearward end an opening 36. The upper leg 31 is provided with a flange 30 which supports a pair of blocks 37 and 38 having a shaft 39 rigidly secured thereto.

The leg 46 of the L-shaped member 32 extends frontwardly and perpendicularly away from the leg 31. A bifurcated element 48 is pivotally supported upon the rightward end of the leg 46 by a pin 47 and the bifurcated element 48 is further secured to one end of a power cylinder 49.

A power cylinder 51 (FIGURE 7) is pivotally secured to the frame 16, and the free end of its actuating rod 52 is pivotally secured to the end of a flange 45 extending from the leg 46 of the L-shaped member 32. A valve 53 (FIGURES 3 and 19), positioned near the cylinder 51, is connected to said cylinder 51 by conduits 237 and 238. Thus, upon appropriate operation of the valve 53, the rod 52 of the cylinder 51 moves the L-shaped member 32 about the substantially vertical axis of the shaft 27.

An elongated arm 56 comprises a base plate 61 to which bearings 57 are secured by the bolts 59 for rotatably engaging the shaft 39 between the blocks 37 and 38 and support the rear end of the elongated arm 56. The arm 56 is further supported by and pivotally connected to the free end of the actuating rod 62 of the cylinder 49, as illustrated in FIGURES 4–6. The cylinder 49 is controlled by a valve 54 (FIGURES 3 and 19) connected by conduits 241 and 242 to said cylinder. Thus, the arm 56 is pivoted about the substantially horizontal axis of the shaft 39 due to appropriate actuation of the cylinder 49 controlled by the valve 54.

A tailpiece 63 (FIGURES 3 and 7) is secured to the rear end of the arm 56 by any convenient means and projects rearwardly therefrom. Two pairs of limit switches 66, 67 and 68, 69 are positioned rearwardly of the arm 56 on opposite sides of the tailpiece 63. The limit switches 66–69 are secured to the upright legs of a U-shaped member 71 secured to the frame 16. One end of a spring 64 is secured to a bracket on the tailpiece 63 and the other end thereof is hooked in the opening 36 in the flange member 34 (FIGURES 4–6).

A housing 72 (FIGURE 3) is secured by welding to the front end of the elongated arm 56. The housing 72 has upper and lower plates 76 and 77 secured together by a plurality of bolts 73, said plates having openings therethrough aligned transversely of the arm 56 for the reception of a shaft 78. The plates 76 and 77 support bearings (not shown) which rotatably support the shaft 78.

A cylinder support 81 is secured to the upper part of the housing 72 and extends upwardly therefrom. A power cylinder 82 is secured to the support 81 by any convenient means (not shown). The actuating rod 83 of the cylinder 82 has a cam member 84 secured to the free end thereof for actuating the limit switch 86, which is secured to a bar 87 extending from and mounted upon the support 81. A rod 88 (FIGURE 8) is secured to the lower end of the cam 84 and extends downwardly through the hollow shaft 78 into the throat 96 of a gripping head 89. The lower end of the rod 88 is bifurcated and has a pin 91 extending between the legs thereof.

The gripping head 89 is provided with a pair of transverse slots 92 and 93 (FIGURE 8). A pin 94, which extends between the legs defining the slot 93, pivotally supports a bell crank 97, the leg 98 of which is provided with an elongated slot 99 slideably receiving the pin 91 on the rod 88 therethrough. The other leg 101 of the bell crank 97 is positioned adjacent the slot 92 so that said leg can move transversely of said slot 92 from its solid line position into the dotted line position thereof to grip an inner convolution of a coil spring 14 as discussed in more detail hereinbelow.

A power cylinder 109 (FIGURE 4) is secured to the base plate 61 of the elongated arm 56 by any convenient means (not shown). The rear end of the cylinder 109 has a valve 112 connected thereto to regulate the reciprocation of the frontwardly extending rod 108. A rack 107 is secured to the free end of the rod 108. The junction between the rack 107 and the rod 108 has a cam 111 projecting upwardly therefrom.

A gear 106 (FIGURE 7) is secured to the hollow shaft 78 and is positioned within the housing 72. Rotation of the gear 106 is affected by a rack 107 secured to the free end of the rod 108 of the cylinder 109. When the rod is fully extended, the right end of the rack 107 projects frontwardly of the housing 72. Thus, a U-shaped guard 113 is provided for safety purposes and is secured to the front end of the housing 72.

A plate 116 (FIGURE 3) is secured to the base plate 61 and extends upwardly therefrom where it has a limit switch 117 secured thereto, said limit switch having a downwardly extending toggle (not shown) in alignment with and actuable by a cam 111. The rod 108 of the cylinder 109 and the rack 107 are constructed so that they will rotate the gear approximately 180 degrees. The purpose of this construction will be explained in more detail hereinbelow.

A valve 118 (FIGURE 3) is secured to the arm 56 by any convenient means (not shown) and is connected by conduits 246 and 247, as discussed in more detail hereinbelow, to the actuating cylinder 82.

A gate mechanism 121 (FIGURES 3 and 19) is positioned forwardly of the positioning device 11 and cooperates with the conveyor 13. A gate switch 122 which is positioned near the gate mechanism 121, is operated by an L-shaped crank 123 pivoted at its apex about the axis of a pin 129. Said crank has one leg 124 projecting through an opening 126 in the guide flange 22A. The other leg 127 of crank 123 is positioned so that it operates the switch 122 as the leg 124 is moved forwardly from its FIGURE 3 position. The leg 124 projects into the channel 25 defined by the guide flanges 21A and 22A and is positioned slightly above the conveyor belt 18.

The gate mechanism 121 includes a base plate 131 which is pivotally mounted upon the frame 16 by the pivot pin 132. A power cylinder 133 is connected at one end to the frame 16 near the forward end of said plate 131 and is controlled by a valve 134 connected to said cylinder 133 by the conduits 248 and 249, as discussed in more detail hereinbelow. The actuating rod 136 of the cylinder 133 is pivotally connected to the adjacent corner of the base plate 131 by a bifurcated element 137 having a pin 138 which is connected to the legs of said element 137 and extends through an aligned opening in the base plate 131.

A limit switch 141 is mounted on the base plate 131 forwardly of the switch 122. A crank 142 is pivotally supported on the base plate 131 by the pivot pin 143 and has a leg 144 projecting through an opening 146 in the guide flange 21A. The opening 146 is spaced forwardly of the opening 126, and the leg 147 of the crank 142 is positioned so that it operates the limit switch 141 when the leg 144 is moved forwardly. A screw type adjustment member 148 engages the leg 147 to accurately position the crank 142 about the pivot axis 143.

The magazine 151 (FIGURE 20) consists of an elongated bar 153 having a tongue 154 projecting from the trailing end of the magazine and a tongue 156 projecting from the leading end of said magazine. Further the bar 153 is mounted on a plurality of inverted U-shaped supporting members 165 (FIGURES 11 and 20) having coplanar flanges 160 projecting laterally away from the lower edges of the legs of the U-shaped supporting member. The outer ends of the flanges 160 are guided by and between the guide flanges 21A and 22A. The magazine 151 further includes a plurality of spring clamps 157, each of which holds a coil spring 14 having uniformly oriented knots 158 thereon, as illustrated in FIGURE 4.

Figure 10:
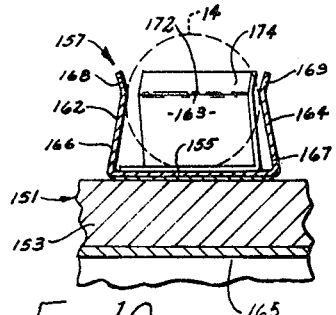
FIGURE 10 is a sectional view taken along the line X—X in FIGURE 9.
Figure 9:
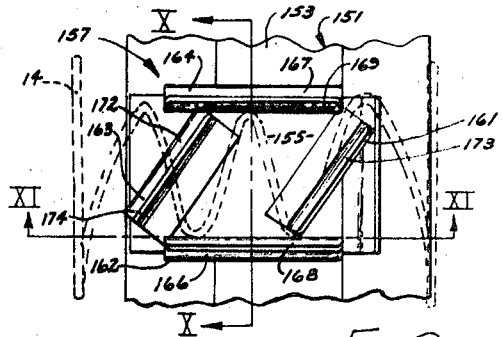
FIGURE 9 is a broken top view of a magazine including a clamp for holding a coil spring.

A plurality of spring coil clamps 157 (FIGURES 9 and 10) are secured to the upper surface of the bar 153 (FIGURE 4), and said clamps comprise four essentially vertical walls 161, 162, 163, and 164. The coil spring 14 is held under radial compression between walls 162 and 164 and the coil is held in the clamp because the walls 162 and 164 converge upwardly from the base plate 155 of the clamp 157 to a point slightly above the central axis of the centermost convolutions of the coil spring, as illustrated in FIGURE 10. The upper portions 168 and 169 of the walls 162 and 164, respectively, flare outwardly to guide the coil spring 14 when it is being inserted into the clamp 157.

The walls 161 and 163 extend transversely substantially between the walls 162 and 164, and they are disposed at similar angles with respect to said walls 162 and 164 so that they will engage the remote sides of a pair of centrally disposed convolutions. The lower portions 171 and 172 of the walls 161 and 163, respectively, converge upwardly to grip the coil. The upper portions 173 and 174 of said walls are flared outwardly to guide the coil spring 14, as it is inserted into the clamp 157.

MODIFIED STRUCTURE

Parts of the modified structure shown in FIGURES 13–18, inclusive, will utilize the same reference numerals as those applied to the corresponding structure shown in FIGURE 1–12, except that the suffix "A" will be added to distinguish the two embodiments.

Figure 15:
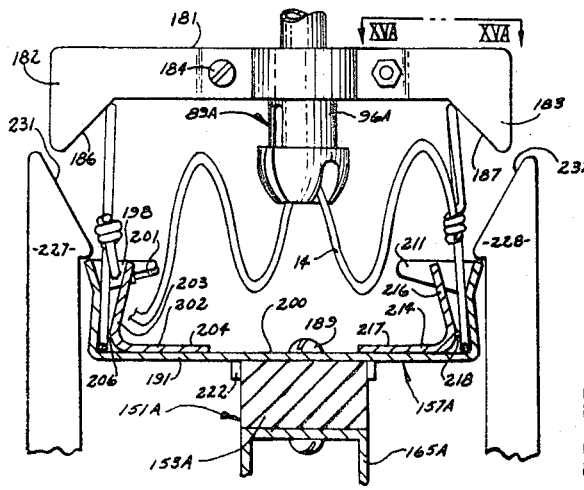
FIGURE 15 is a sectional view similar to FIGURE 14 and including the coil-positioning device and a coil spring contained therein positioned for removal of the spring.
Figure 14:
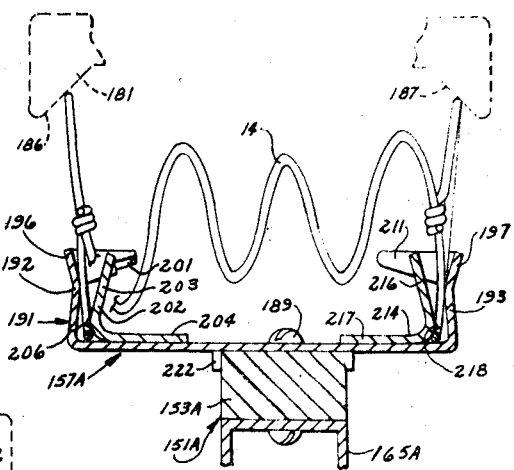
FIGURE 14 is a sectional view of a magazine including said modified clamp and taken along the line XIV—XIV in FIGURE 13.

Referring now to FIGURE 15, the gripping head 89A has been provided with a crosshead 181 secured to the throat 96A by a plurality of bolts 184. The opposite ends of the crosshead 181 are bifurcated and have a pair of downwardly projecting legs 182 and 183, the inner surfaces 186 and 187, respectively, of which are beveled at an angle of approximately 45 degrees with respect to the axis of the throad 96A.

The magazine 151A is mounted on a plurality of inverted U-shaped supporting members 165A (FIGURE 16) and supports a plurality of modified clamps 157A each of which is secured thereto by a screw 189. Each clamp 157A comprises a generally channel-shaped frame member 191 having a pair of upwardly converging flanges 192 and 193. The upper end portions 196 and 197 of the flanges 192 and 193 are flared outwardly. A pair of substantially parallel projections 198 and 199 (FIGURE 13) extend inwardly from the opposite edges of the upper end portion 196. An inwardly projecting tab 201 is formed on the lower edge of the projection 198.

An L-shaped gripping member 202 has a leg 204 (FIGURE 13) secured to the base plate 200 of the U-shaped frame member 191 by any convenient means, and the leg 203 of member 202 is spaced from, and diverges slightly upwardly (FIGURE 15) with respect to, the flange 192. A tab 206 projects outwardly from the outer surface of the leg 203 of the L-shaped member 202 at a point thereon spaced from the base plate 200 and from the flange 192 distances approximately equal to the diameter of the wire in said coil spring 14. The upper end of the leg 203 is provided with an extension 208 (FIGURE 13) projecting therefrom parallel with flange 192 for engagement with the tab 201.

The right end (FIGURE 13) of the clamp 157A is essentially a mirror image of the left end thereof in that a pair of projections 211 and 212 extend inwardly from the opposite edges of the upper end portion of the flange 193. A tab 213 is formed on the lower edge of the innermost portion of the projection 212. An L-shaped member 214, preferably identical to the L-shaped member 202, has a leg 217 which is secured to the base plate 200 of the channel-shaped member 191. The member 214 has an essentially vertical leg 216 which diverges upwardly with respect to the flange 193. A tab 218 (FIGURE 15) projects from the outer surrface of the leg 216 and is spaced from the base plate 200 and from the inner surface of the flange 193 distances about equal to the diameter of the wire in the coil spring 14. The upper end of the leg 216 is provided with an extension 221 projecting therefrom parallel with the flange 193 for engagement with the tab 213.

The base plate 200 of the member 191 has integral tabs 222 (FIGURE 15) which are bent downwardly to grip the bar 153A of the magazine 151A. The tabs 222 also prevent relative rotation about the axis of the screw 189 so that only one screw is required to secure the clamp 157A to the bar 153A.

In the area of the indexing station 226 (FIGURE 19) a pair of essentially parallel guide members 227 and 228 (FIGURES 15 and 16) are provided adjacent the conveyor 13. The upper ends of the guide members 227 and 228 are provided with beveled edges 231 and 232, respectively, which slope inwardly and downwardly toward the clamp 157A. The lower portions of the beveled edges 231 and 232 project over the flared portions 196 and 197 of the flanges 192 and 193, respectively, of the clamp 157A for reasons which will be discussed in more detail hereinbelow.

SCHEMATIC OF FIGURE 19

As discussed very briefly hereinabove, the valves 53, 54, 112, 118 and 134 are connected respectively to the cylinders 51, 49, 109, 82 and 133 by appropriate conduits. A pressure fluid source FS is connected by a conduit 236 and appropriate branch conduits to the input ports of the valves 53, 54, 112, 118 and 134. While the power cylinders may be operated by any conventional pressure fluid, air is preferably used in this particular embodiment. Also, the aforementioned valves are preferably two-position, solenoid-operated valves and they have been illustrated schematically.

An electrical source ES of low voltage is electrically connected by a line 251 to one side of each of the limit switches 66–69, 86, 117, 122 and 141. The other side of the limit switch 66 is connected by a conductor 252 to the solenoid 261 on the valve 118. The other side of the limit switch 67 is connected by a conductor 253 to the solenoids 266 and 263 on the valves 53 and 112, respectively. The other side of the limit switch 68 is connected by a conductor 254 to the solenoid 262 on the valve 118. The other side of the limit switch 69 is connected to the solenoids 267, 264 and 269 on the valves 53, 112 and 134, respectively. The other side of the limit switch 86 is connected by a conductor 256 to the solenoid 272 on the valve 54. The other sides of the limit switches 117 and 141 are connected by conductors 257 and 258, respectively, to the solenoid 271 on the valve 54. The other side of the limit switch 122 is connected to the solenoid 268 of the valve 134. A common ground line 259 is connected to each of the solenoids on the respective valves.

OPERATION

Although the operation of the device embodying the invention has been indicated above, said operation will be described in detail hereinbelow for a better understanding of the invention.

Figure 11:
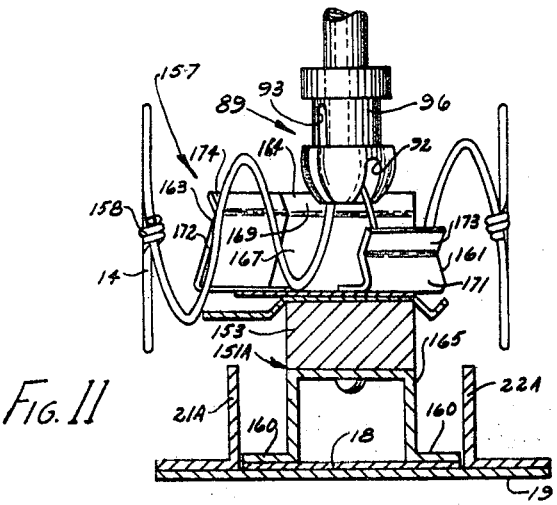
FIGURE 11 is a sectional view of a magazine substantially as taken along the cutting line XI—XI in FIGURE 9 and including a coil spring.

As a magazine 151 moves along the conveyor 13, it engages the arm 124 (FIGURES 3 and 19) projecting through the opening 126 of the guide flange 22A, thereby closing the limit switch 122 to energize the solenoid 268 on the valve 134. As shown schematically in FIGURE 19, this causes the rod 136 of the cylinder 133 to move the gate mechanism 121 from the dotted line position to the solid line position whereby the leg 144 of the crank 142 is moved into the path of the trailing support member 165 secured to the left end (FIGURE 20) of the magazine thereby blocking the movement of the magazine by the conveyor 13. When the magazine is thereby stopped, the trailing spring 14 in the magazine 151 is positioned at the indexing station 226. The magazine 151 is stopped as the trailing support member 165 strikes the arm 144. Adjustment of the member 148 permits accurate alignment of the spring 14 in the indexing station 226 with the head 89. When the arm 144 is struck by the support member 165, the limit switch 141 is closed to energize the solenoid 271 on the valve 54. Energization of the solenoid 271 operates said valve 54 so that the rod 62 of the cylinder 49 is retracted and thereby lowers the elongated arm 56 about the pivot axis 39. The slot 92 in the head 89 receives one of the inner convolutions of coil spring 14, as illustrated in FIGURE 11.

When the elongated arm 56 reaches its lowermost position (FIGURE 4), the tailpiece 63 closes the limit switch 66 to energize the solenoid 261 on the valve 118. Energization of the solenoid 261 causes the valve 118 to retract the rod 83 of the cylinder 82, whereby the arm 84 secured thereto is moved upwardly and closes the limit switch 86 to energize the solenoid 272 of the valve 54. Retraction of the rod 83 also raises the rod 88 and the pin 91 (FIGURE 8) which moves the bell crank 97 from the solid line position to the dotted line position to grip the upper portion of one of the inner convolutions of the coil spring 14.

Energization of the solenoid 272 causes the valve 54 to operate the cylinder 49 whereby the elongated arm 56 is raised about the pivot axis 39. As the elongated arm rises, the tailpiece 63 closes the switch 67 to energize solenoids 263 and 266 on the valves 112 and 53, respectively. Energization of the solenoid 263 causes the valve 112 to effect a rightward movement of the rack 107 secured to the rod 108 of the cylinder 109, whereby the head 89 is rotated approximately 180 degrees. Thus, the coil spring 14 held by the head 89 is rotated from its FIGURE 11 position to its FIGURE 12 position.

Figure 12:
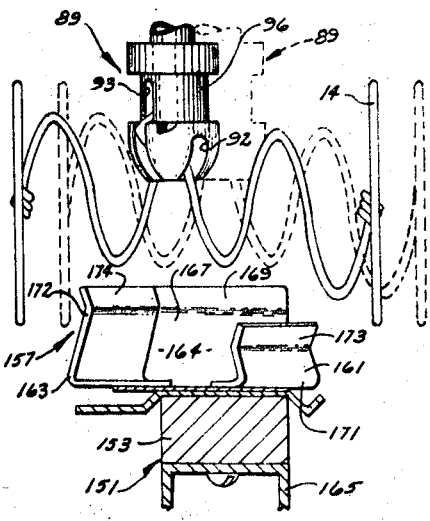
FIGURE 12 is a sectional view similar to that shown in FIGURE 11 except that the coil spring has been rotated approximately 180 degrees.
Figure 13:
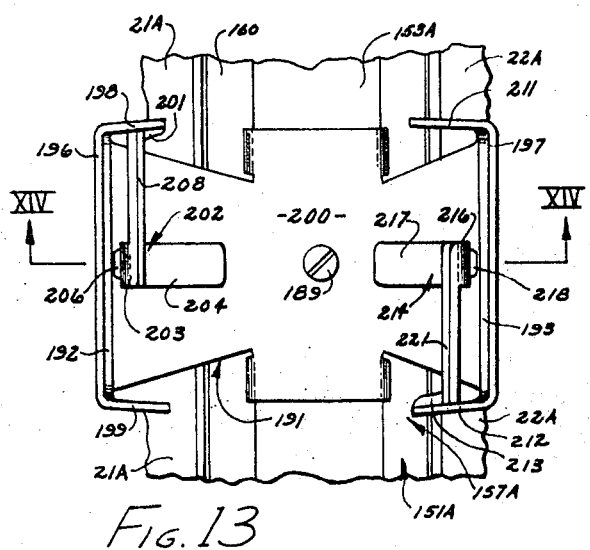
FIGURE 13 is a broken top view of a magazine including a modified clamp for holding a coil spring.

Energization of the solenoid 266 operates the valve 53 to cause a retraction of the rod 52 into the cylinder 51, whereby the elongated arm 56 is pivoted about the pivot pin 27 and shifts the gripping head 89 from its dotted line position to its solid line position illustrated n FIGURE 12. It is recognized, however, that under some circumstances it may not be necessary to shift the elongated arm 56 about the pivot pin 27.

Near the end of the forward movement of the rack 107 and the rod 108, the cam 111 closes the limit switch 117 to energize the solenoid 271 of the valve 54, whereby the valve 54 effects retraction of the rod 62 and thereby lowers the elongated arm 56 about the pivot axis 39. Thus, the elongated arm 56 moves from the FIGURE 5 position to the FIGURE 6 position with the knot 158 on the coil spring 14 being reversed 180 degrees from the positions of the corresponding knots on the other spring coils in the same magazine. After the elongated arm 56 replaces the coil spring 14 into the clamp 157, the tailpiece 63 closes the limit switch 68 to energize the solenoid 262 on the valve 118. The valve 118 is thus operated to move the rod 83 downwardly whereby the bell crank 97 is moved from the dotted line position in FIGURE 8 to its solid line position, thereby releasing the inner convolution of the coil spring 14. As the rod 83 moves downwardly, the arm 84 closes the limit switch 86 to energize the solenoid 272 of the valve 54. Energization of the solenoid 272 causes the valve 54 to operate the cylinder 49 and thereby raise the elongated arm 56 about the pivot axis 39. Thus, the tailpiece 63 closes the limit switch 69 thereby energizing the solenoids 264, 267 and 269. Energization of the solenoid 264 causes the valve 112 to retract the rod 108 and the rack 107 whereby the gripping head 89 is rotated back to the starting position.

Energization of the solenoid 267 causes the valve 53 to operate the cylinder 51 and thereby pivot the elongated arm 56 about the pivot pin 27 back to its starting position. Energization of the solenoid 269 operates the valve 134 to retract the rod 136 whereby the gate mechanism 121 is moved from the solid line position to the dotted line position (FIGURE 19), and leg 144 of the crank 142 is moved out of the path of the magazine 151. The conveyor 13 thereafter moves the magazine 151 forwardly into the spring assembly machine 10.

The tongue 154 on the trailing end of the magazine 151 and the tongue 156B on the leading end of the next magazine 151B separate the two magazines, as illustrated in FIGURE 4. The gaps above the below the tongues separating the two magazines define the index points for the gate mechanism 121. That is, as the magazines 151 and 151B move forwardly following the release of the gate mechanism 121, the leg 124 projecting through the opening 126 (FIGURE 3) moves momentarily into the gap between the magazines and thereby resets the limit switch 122. However, the leading end of the magazine 151B promptly engages the leg 124 to actuate the limit switch 122 and thereby operate the solenoid 268 on the valve 134. This causes the valve 134 to move the gate mechanism 121 from its dotted line position to its solid line position (FIGURE 19). Such movement of the base plate 131 is completed before the trailing support member 165B on the magazine 151B engages the leg 144. Thus, the leg 144 of the crank 142 will project through the opening 146 in the guide flange 21A into the path of the trailing support member 165B to thereby stop same. When the magazine 151B is stopped, the spring coil 14B adjacent the trailing end of the magazine 151B will be positioned at the indexing station 226. Accordingly, the operation discussed hereinabove with respect to the rotation of the spring coil 14 can be repeated on the spring coil 14B.

OPERATION RELATING TO FIGURES 13–18

The mechanism shown in FIGURE 3 and utilized to engage and rotate the coil spring 180 degrees may be substantially the same as discussed hereinabove, except for the crosshead 181 (FIGURE 15) secured to the throat 96A of the gripping head 89A. A coil spring 14 is held under compression in the clamp 157A (FIGURE 14) so that the end convolutions thereof are beneath the tabs 206 and 218. Thus, these tabs will positively oppose an upward force exerted on the coil spring while it is in the clamp 157A. As the gripping head 89A moves downwardly, the beveled edges 186 and 187 on the crosshead 181 engage the upper edges of the end convolutions of the coil spring 14, as indicated in dotted lines in FIGURE 14, and move them inwardly. When said gripping head 89A reaches its lowermost position and an inner convolution of the coil spring 14 is snugly within the slot 92, the lower edges of the end convolutions are moved from their FIGURE 14 positions to their FIGURE 15 positions so that the coil spring 14 can be moved upwardly from the clamp 157A without interference from the tabs 206 and 218. As the gripping head 89A moves upwardly carrying the coil spring 14 out of the clamp 157A, the lower edges of the compressed end convolutions will move outwardly, as indicated in FIGURE 16, wherein the spring coil 14 has been rotated 180 degrees from the FIGURE 15 position.

Figure 16:
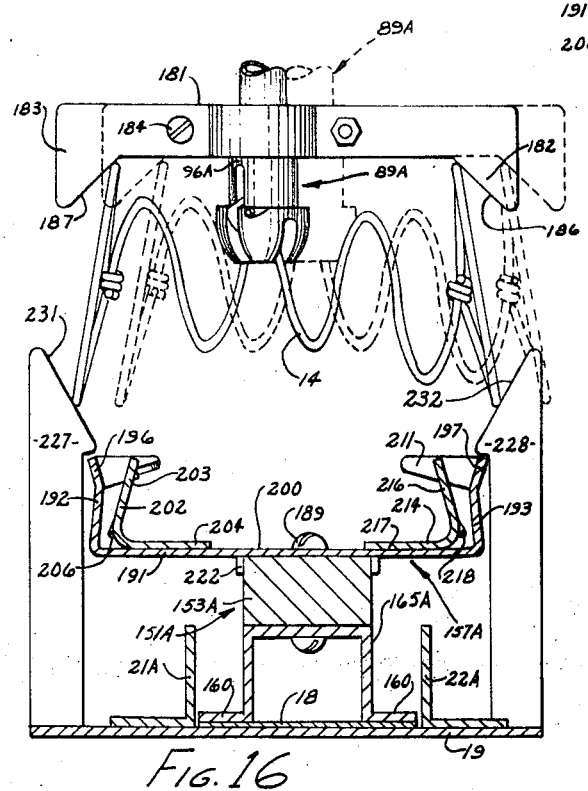
FIGURE 16 is a sectional view similar to FIGURE 15 with the spring head in a raised position and rotated about 180 degrees.
Figure 15A:
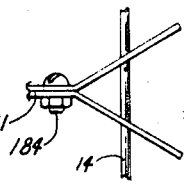
FIGURE 15A is a sectional view taken along the line XVA—XVA in FIGURE 15.

As illustrated in dotted lines in FIGURE 16, rotation of the spring coil 14 moves it out of alignment with the clamp. That is, the right end convolution projects outside of the guide member 228. A lateral shift of the coil spring is accomplished by the same mechanism discussed previously with respect to FIGURES 7, 11 and 12, whereby the gripping head 89A is moved from the dotted line position to the solid line position in FIGURE 16. The lower edges of the end convolutions of the coil spring 14 are thereby brought into alignment with the guide edges 231 and 232 so that downward movement of the gripping head 89A causes said lower edges to slide along the beveled surfaces 231 and 232 and thence into the clamp 157A. Thus, after the bell crank 97 releases its grip on the coil spring and the gripping head 89A moves upwardly, the end convolutions will promptly resume their FIGURE 14 positions, where the spring is locked in the clamp.

An important advantage of the clamping mechanism 157A is illustrated in FIGURES 17 and 18, which show a magazine containing a plurality of coil springs after it has moved from the indexing station 226, by a release of the gate mechanism 121, to the spring assembly machine 10. Appropriate mechanism of the type disclosed in the aforesaid Patent No. 3,205,915 is energized when the magazine reaches a selected position in the spring assembly machine 10 whereby the magazine and the coil springs are tilted into the assembling position. Since the end convolutions of each spring 14 are firmly engaged by the clamp 157A, said end convolutions are positively moved into the jaws of the machine, as illustrated in FIGURE 18. A compression of the outer edges of the end convolutions will occur as they slide into the jaws of the machine whereby the inner edges of the end convolutions are released from engagement by the tabs 206 and 218. Thus, upon retraction of the magazine 151A, the end convolutions, hence the springs 14, are released from the clamp 157A so that the magazine can be returned to the conveyor 13 and returned to the spring-forming machine.

Although particular preferred embodiments of the invention have been disclosed above for illustrative purposes, it will be understood that variations or modifications thereof which lie within the scope of the appended claims are fully contemplated.

The embodiments of the invention in which an exclusive property or privilege is claimed are defined as follows:

1. In an apparatus having a magazine for holding a plurality of coil springs as they are advanced to a machine for assembling said coil springs into a spring assembly, a device for removing one of said coil springs from said magazine and replacing it into the magazine in a different position, comprising:
   a frame;
   support means mounted upon said frame for movement toward and away from a station occupied by said magazine;
   first actuating means for effecting said movement of said support means;
   coil-engaging means movably mounted on said support means and releasably engageable with one of said springs in said magazine;
   second actuating means for effecting engagement of a coil by said coil-engaging means; and
   control mechanism for effecting and synchronizing the operation of said first and second actuating means.

2. The device defined in claim 1, wherein said support means is an elongated arm pivotable around first and second transverse axes;
   wherein said first actuating means effects movement of said arm around said first axis; and
   including third actuating means for effecting pivotal movement of said arm around said second axis and responsive to said control mechanism.

3. The device defined in claim 2, wherein said actuating means are pressure fluid operated cylinders.

4. In an apparatus including a machine for automatically forming a spring assembly from a plurality of coil springs and helicals, mechanism for placing a group of said coil springs in selected positions with respect to each other for presentation to said machine and subsequent assembly with said helicals, comprising:
   a magazine having a plurality of clamp means arranged to hold a plurality of coil springs in spaced alignment;
   conveyor means for advancing said magazine along a path toward said spring assembly machine;
   support means mounted for movement toward and away from said path;
   first actuating means for effecting said movement of said support means;

coil-engaging means mounted upon said support means for rotation through an angle of approximately 180 degrees around an axis transverse of said path, said coil-engaging means having grip means adapted to remove said coil spring from said magazine as said support means is moved away from said path;

second actuating means for effecting operation of said coil-engaging means; and control means for effecting and synchronizing the operation of said first and second actuating means.

5. Mechanism according to claim 4, wherein said clamp means engages the axially outermost convolutions of the coil spring and holds said coil spring under compression, said clamp means including lock means opposing accidental disengagement of said coil spring from said clamp means; and release means on said coil-engaging means engageable with said outermost convolutions for moving them toward each other whereby said coil spring is disengaged from said lock means as said coil-engaging means grips said coil spring.

6. In an apparatus including a machine for automatically forming a spring assembly from a plurality of coil springs and helicals, the combination comprising:

plural pairs of spring-engaging jaws arranged in a substantially horizontal line along said machine;

conveyor means extending along a path, a portion of which is parallel with and adjacent to said line of jaws;

a magazine having a plurality of spaced and aligned clamps, each clamp being capable of holding a coil spring and said magazine being adapted to move along said conveyor means;

coil spring turning means including mechanism mounted adjacent said path for rotating the coil spring at one end of said magazine approximately 180 degrees around an axis transverse of said path;

actuating means for effecting the operation of said mechanism responsive to the movement of said magazine along said conveyor means.

7. In a magazine adapted to hold a plurality of coil springs in spaced aligned positions with respect to each other for simultaneous presentation to a machine for forming a spring assembly from said coil springs and from helicals, the combination comprising:

an elongated base member;

channel-shaped clamp means having a web removably secured to said member and a pair of spaced and substantially parallel flanges extending in substantially the same direction away from said member, the distance between said flanges being somewhat less than the undistorted axial length of a coil spring;

spring-retaining means on each of said flanges near the free edges thereof and extending toward each other to define with said flanges a zone in which a coil spring is held;

a pair of holding elements rigidly secured to said clamp means and extending from said web along said flanges and spaced therefrom; and cooperating means on said holding elements and said flanges for releasably holding the end convolutions of a coil spring therebetween, release of said end convolutions from said clamp means being effected by compressing the portions of said coil spring remote from the web.

8. A magazine according to claim 7, wherein said flanges converge away from said web to points spaced substantially therefrom and thereafter diverge away from said web;

wherein said holding elements converge away from said web; and including projections on said holding elements near said web extending toward said flanges, said projections being spaced from said web and said adjacent flanges a distance slightly greater than the diameter of the material from which said coil springs are formed.

9. A magazine according to claim 8, wherein each holding element includes an extension parallel with and spaced from the adjacent flange, said extension extending from that end of its holding element remote from the web to one of said retaining means for guiding a said end convolution into said clamp means.

10. A method for producing a spring assembly from a plurality of coil springs having their knots oriented in selected positions, the steps comprising:

placing coil springs into a plurality of spring-holding clamps secured to a magazine with said knots in the same relative positions;

moving said magazine along a path to a location wherein one coil spring is positioned at an indexing station;

rotating a coil spring at a predetermined location in said magazine approximately 180 degrees around an axis transverse of said path;

moving said magazine along said path to a spring assembly machine; and moving said magazine laterally from said path toward said assembly machine, whereby all of said coil springs are simultaneously moved into position for engagement by a helical.

References Cited

UNITED STATES PATENTS

| 2,716,308 | 8/1955 | Hodges | 140—3 |
| 3,193,136 | 7/1965 | Stumpf et al. | 140—92.7 |
| 3,205,915 | 9/1965 | Kamp | 140—3 |
| 3,362,439 | 1/1968 | Foreman | 140—3 |

CHARLES W. LANHAM, Primary Examiner

LOWELL A. LARSON, Assistant Examiner

U.S. Cl. X.R.

214—1